United States Patent
Sakata

(10) Patent No.: US 7,463,965 B2
(45) Date of Patent: Dec. 9, 2008

(54) ROLL-OVER SUPPRESSING CONTROL APPARATUS FOR A VEHICLE

(75) Inventor: Kunio Sakata, Tokyo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 347 days.

(21) Appl. No.: 10/953,485

(22) Filed: Sep. 29, 2004

(65) Prior Publication Data

US 2005/0110345 A1 May 26, 2005

(30) Foreign Application Priority Data

Sep. 30, 2003 (JP) ............................. 2003-341501

(51) Int. Cl.
*B60T 8/175* (2006.01)

(52) U.S. Cl. .......................... 701/83; 701/74

(58) Field of Classification Search ................ 180/282; 280/5.502, 5.506, 400; 303/140, 146; 340/440; 701/38, 45, 70, 124

See application file for complete search history.

(56) References Cited

U.S. PATENT DOCUMENTS

| | | | |
|---|---|---|---|
| 5,134,352 A | 7/1992 | Matsumoto et al. | |
| 5,683,152 A | 11/1997 | Hu | |
| 5,747,683 A | 5/1998 | Gerum et al. | |
| 5,964,819 A | 10/1999 | Naito | |
| 6,074,020 A | 6/2000 | Takahashi et al. | |
| 6,076,898 A | 6/2000 | Ota et al. | |
| 6,081,761 A * | 6/2000 | Harada et al. | 701/72 |
| 6,086,168 A * | 7/2000 | Rump | 303/191 |
| 6,176,555 B1 | 1/2001 | Semsey | |
| 6,315,373 B1 | 11/2001 | Yamada et al. | |

(Continued)

FOREIGN PATENT DOCUMENTS

DE 19958895 6/2000

(Continued)

OTHER PUBLICATIONS

Relevant portion of German Office Action of related German Application 10 2004 046 987.3-21.

(Continued)

*Primary Examiner*—Jack W Keith
*Assistant Examiner*—Ari M Diacou
(74) *Attorney, Agent, or Firm*—Rossi, Kimms & McDowell LLP

(57) ABSTRACT

The invention provides a roll-over suppressing control apparatus for a vehicle wherein appropriate braking force can be applied to a turning outer wheel in response to a situation and a rolling state of the vehicle to suppress otherwise possible roll-over of the vehicle while assuring the traveling performance. A roll parameter value detection section detects a parameter value corresponding to a rolling state of a vehicle, and a turning type decision section decides a type of turning of the vehicle. A roll-over suppressing control section controls a braking mechanism in a predetermined period so that, when the rolling state of the vehicle upon turning of the vehicle is excessive with respect to a first reference state, an amount of braking force corresponding to the magnitude of the roll parameter value and the type of turning. By the control, while the traveling performance of the vehicle is assured, roll-over of the vehicle can be suppressed effectively to assure the stability of the vehicle.

11 Claims, 6 Drawing Sheets

U.S. PATENT DOCUMENTS

| | | | |
|---|---|---|---|
| 6,332,104 B1* | 12/2001 | Brown et al. | 701/1 |
| 6,360,147 B1 | 3/2002 | Lee | |
| 6,378,957 B1 | 4/2002 | Vaagstedt | |
| 6,431,663 B1 | 8/2002 | Fennel et al. | |
| 6,438,464 B1* | 8/2002 | Woywod et al. | 701/1 |
| 6,496,758 B2* | 12/2002 | Rhode et al. | 701/1 |
| 6,529,803 B2* | 3/2003 | Meyers et al. | 701/1 |
| 6,554,293 B1 | 4/2003 | Fennel et al. | |
| 6,600,985 B2 | 7/2003 | Weaver et al. | |
| 6,668,225 B2 | 12/2003 | Oh et al. | |
| 6,708,088 B2 | 3/2004 | Matsuno et al. | |
| 6,719,088 B2 | 4/2004 | Nakano et al. | |
| 6,834,218 B2 | 12/2004 | Meyers et al. | |
| 6,865,469 B2 | 3/2005 | Batistic et al. | |
| 6,904,350 B2 | 6/2005 | Lu et al. | |
| 7,118,184 B2* | 10/2006 | Harada et al. | 303/146 |
| 2001/0037677 A1 | 11/2001 | Holst et al. | |
| 2002/0082749 A1* | 6/2002 | Meyers et al. | 701/1 |
| 2002/0095244 A1* | 7/2002 | Rhode et al. | 701/1 |
| 2002/0095251 A1* | 7/2002 | Oh et al. | 701/70 |
| 2002/0107627 A1* | 8/2002 | Funke et al. | 701/70 |
| 2003/0055549 A1* | 3/2003 | Barta et al. | 701/70 |
| 2003/0060960 A1* | 3/2003 | Hartmann | 701/70 |
| 2003/0100979 A1 | 5/2003 | Lu et al. | |
| 2003/0163231 A1* | 8/2003 | Meyers et al. | 701/1 |
| 2003/0204293 A1 | 10/2003 | Shiino et al. | |
| 2004/0041358 A1* | 3/2004 | Hrovat et al. | 280/5.502 |
| 2004/0117085 A1 | 6/2004 | Lu et al. | |
| 2004/0216020 A1 | 10/2004 | Stiller | |
| 2004/0254703 A1 | 12/2004 | Traechtler et al. | |
| 2005/0049773 A1 | 3/2005 | Kitapini et al. | |
| 2005/0099065 A1* | 5/2005 | Harada et al. | 303/146 |
| 2005/0102084 A1* | 5/2005 | Sakata | 701/70 |
| 2005/0251316 A1 | 11/2005 | Kato et al. | |
| 2006/0064213 A1 | 3/2006 | Lu et al. | |

FOREIGN PATENT DOCUMENTS

| | | |
|---|---|---|
| DE | 100 39 108 A1 | 7/2001 |
| DE | 101 35 020 A1 | 2/2003 |
| DE | 102 54 211 A1 | 9/2003 |
| DE | 103 18 111 A1 | 11/2004 |
| DE | 103 31 726 A1 | 2/2005 |
| JP | 10024820 A | 1/1998 |
| JP | 10-81215 A | 3/1998 |
| JP | 11-11272 A | 1/1999 |
| JP | 2000-168526 A | 6/2000 |
| JP | 2000-344075 A | 12/2000 |
| JP | 2000-346869 A | 12/2000 |
| JP | 200335388 A | 12/2000 |
| JP | 2001-105927 A | 4/2001 |
| JP | 2001-354128 A | 12/2001 |
| JP | 3257354 B2 | 12/2001 |
| JP | 2002-166826 A | 6/2002 |
| JP | 2002-168620 A | 6/2002 |

OTHER PUBLICATIONS

Relevant portion of German Office Action of corresponding German Application 10 2004 047 394.3-21.

Relevant portion of Chinese Office Action of corresponding Chinese Application of related co-pending U.S. Appl. No. 10/954,997.

Notice of Reasons for rejection, mailed on Jul. 8, 2008, in corresponding JP 2003-341501; partial translation provided.

* cited by examiner

ROLL-OVER SUPPRESSING CONTROL APPARATUS FOR A VEHICLE

BACKGROUND OF THE INVENTION (1) Field of the Invention

This invention relates to a roll-over suppressing control apparatus for a vehicle wherein the braking force is controlled in response to a rolling state of the vehicle upon turning to suppress the roll-over of the vehicle.

(2) Description of the Related Art

Upon general turning or upon special turning such as upon lane change of a vehicle, depending upon the traveling speed or the steering situation of the vehicle, a moment in the rolling direction is generated on the vehicle, and there is the possibility that the moment may cause roll-over (turning over on its side) of the vehicle. Therefore, various apparatus have been proposed conventionally including an apparatus which issues, if the possibility of roll-over occurs with a vehicle, a notification of the possibility to the driver and an apparatus which takes a countermeasure for the safety, a braking countermeasure or a like countermeasure before a vehicle is brought into roll-over thereby to prevent the possible roll-over.

For example, as a technique for suppressing roll-over of a vehicle, a technique has been developed wherein the rolling angle of a vehicle is detected to determine the risk of the rolling state of the vehicle and a warning is issued to the driver at an early stage and braking control is performed in response to the risk (refer to Japanese Patent Laid-Open No. 2002-168620). According to the technique described, the rolling angle $\theta$ of the vehicle is arithmetically operated based on a signal of a vehicle height sensor, and the roll rate (rolling angular velocity) $\omega$ is arithmetically operated based on the rate of change of the rolling angle $\theta$. Then, a roll emergency as a scale indicating the magnitude of the risk of roll-over of the vehicle is decided based on the magnitude of the roll rate $\omega$. Then, it is decided based on the roll emergency and the rolling angle $\theta$ whether or not there is the risk that the vehicle may roll over, and slowdown control is executed and a warning lamp and a warning device are rendered operative to give a warning to the driver based on a result of the decision of the risk of the roll-over.

As a similar technique, also a technique wherein an air brake system is rendered operative in response to the magnitude of the roll rate (rolling angular velocity) of a vehicle has been proposed (refer to, for example, Japanese Patent Laid-Open No. Hei 11-11272). According to the technique described, the roll rate generated on the vehicle body is detected by a rate sensor, and a target deceleration is set among three stages based on the state of the roll rate and the level of the steering angular velocity. Then, the air brake system is operated in accordance with the target deceleration to slow down the vehicle thereby to suppress otherwise possible roll-over of the vehicle.

However, where roll-over suppressing control is performed in response to the roll rate of a vehicle as described above, if a roll-over suppressing control amount is set simply in accordance with the value of the roll rate, then suppression of roll-over cannot necessarily be performed appropriately.

For example, in the case of general one-directional turning, since the roll rate gradually increases, even if the roll-over suppressing control amount is set to a comparatively low value with respect to the roll rate, the roll-over can be suppressed sufficiently. However, in the case of steering back turning wherein the turning direction changes over halfway as represented by lane change, the roll rate increases rapidly, which is likely to cause roll-over of the vehicle, and therefore, if the roll-over suppressing control amount is not set to a high value relative to the roll rate, there is the possibility that the roll-over may not be suppressed with certainty.

Further, if the roll-over suppressing control amount is set to a high value relative to the roll rate in order to solve such a subject as just described, then although roll-over upon steering back turning such as upon lane change can be suppressed effectively by the great control amount, upon general one-directional turning, excessively high braking force which is not commensurate with the risk of the roll-over acts and slows down the vehicle suddenly, resulting in deterioration of the traveling performance of the vehicle and also in hurt of the feeling of the driver.

In short, even if the detection value of the roll rate is equal, the risk of roll-over differs depending upon the turning situation (type of turning) of the vehicle, and the braking control amount for suppressing roll-over of the vehicle should be determined not only setting it so as to correspond to a parameter indicative of a rolling state such as the roll rate but also taking the type of turning into consideration such as whether the turning is general one-directional turning or steering back turning (for example, upon lane change or upon S-shaped curve traveling).

SUMMARY OF THE INVENTION

It is an object of the present invention to provide a roll-over suppressing control apparatus for a vehicle wherein appropriate braking force is applied to a turning outer wheel in response to a turning situation and a rolling state of the vehicle to suppress otherwise possible roll-over of the vehicle while assuring the traveling performance.

In order to attain the object described above, according to an aspect of the present invention, there is provided a roll-over suppressing control apparatus for a vehicle, comprising a braking mechanism capable of braking left and right wheels of the vehicle separately from each other, roll parameter value detection means for detecting a parameter value corresponding to a rolling state of the vehicle, turning type decision means for deciding a type of turning of the vehicle, and roll-over suppressing control means for controlling the braking mechanism in a predetermined period so that, if the rolling state of the vehicle upon turning of the vehicle becomes greater than a first reference state, then an amount of braking force which depends upon the magnitude of the parameter value detected by the roll parameter value detection means and the type of turning of the vehicle decided by the turning type decision means is applied to the turning outer wheel.

With the roll-over suppressing control apparatus for a vehicle, when the rolling state of the vehicle is excessive, an amount of braking force commensurate with the magnitude of the parameter value representative of the rolling state of the vehicle and the type of turning is applied to the turning outer wheel. Consequently, while the traveling performance of the vehicle is assured, roll-over of the vehicle can be suppressed effectively to assure the stability of the vehicle.

Preferably, the roll-over suppressing control means ends the control for applying the braking force to the turning outer wheel when the rolling state of the vehicle upon turning of the vehicle becomes smaller than a second reference state on the rolling stability side with respect to the first reference state.

With the roll-over suppressing control apparatus for a vehicle, while the rolling state of the vehicle remains excessive, the roll-over suppressing control (control of applying the braking force to the turning outer wheel described above) can be continued. Then, when the vehicle comes out from the excessive rolling state, the roll-over suppressing control (control of applying the braking force to the turning outer wheel described above) can be stopped.

One of types of turning of the vehicle is steering back turning wherein the turning direction is changed over halfway, and preferably the roll-over suppressing control means sets the amount of braking force to be applied to the turning outer wheel to a maximum value to control the braking mechanism when the magnitude of the parameter value detected by the roll parameter value detection means upon the steering back turning is equal to or greater than a first threshold value. It is to be noted that the control of setting the amount of braking force to be applied to the turning outer wheel to the maximum value may be continued until the steering back turning of the vehicle comes to an end or until the turning of the vehicle comes to an end.

With the roll-over suppressing control apparatus for a vehicle, roll-over of the vehicle upon quick steering back turning as represented, for example, by lane change can be suppressed effectively.

Preferably, when the magnitude of the parameter value detected by the roll parameter value detection means upon the steering back turning is equal to or higher than a second threshold value set in advance as a value lower than the first threshold value but is lower than the first threshold value, the roll-over suppressing control means sets the amount of braking force to be applied to the turning outer wheel to a positive fixed value set in advance to control the braking mechanism.

With the roll-over suppressing control apparatus for a vehicle, upon steering back turning, roll-over of the vehicle can be suppressed effectively.

Preferably, when the magnitude of the parameter value detected by the roll parameter value detection means upon the steering back turning is equal to or higher than a third threshold value set in advance as a value lower than the second threshold value but is lower than the second threshold value, the roll-over suppressing control means controls the braking mechanism to maintain the braking force to the turning outer wheel.

With the roll-over suppressing control apparatus for a vehicle, upon steering back turning, roll-over of the vehicle can be suppressed effectively while the braking force is prevented from being applied excessively.

Preferably, when the magnitude of the parameter value detected by the roll parameter value detection means upon the steering back turning is lower than the third threshold value, the roll-over suppressing control means sets the amount of braking force to be applied to the turning outer wheel to a negative fixed value set in advance to control the braking mechanism.

With the roll-over suppressing control apparatus for a vehicle, the braking force can be reduced while roll-over of the vehicle upon lane change is suppressed effectively.

Preferably, one of the types of turning of the vehicle is one-directional turning wherein the vehicle turns only in one direction, and the roll-over suppressing control means performs PID control based on the parameter value detected by the roll parameter value detection means upon the one-directional turning or another parameter value corresponding to the parameter value to control the amount of braking force to be applied to the turning outer wheel. It is to be noted that the PID control may be carried out based on the difference between a theoretical yaw rate and an actual yaw rate (detected yaw rate) or may otherwise be performed based on the difference between a roll rate at a point of time when roll-over suppressing control is started and a later actual roll rate (detected roll rate).

With the roll-over suppressing control apparatus for a vehicle, upon one-directional turning different from steering back turning, roll-over of the vehicle can be suppressed effectively by the PID control.

Preferably, parameters indicative of the rolling state of the vehicle include a roll rate of the vehicle.

With the roll-over suppressing control apparatus for a vehicle, control can be carried out which is superior in responsiveness to a sudden change of the rolling state of the vehicle (that is, a change of the rolling state which arises from quick steering upon emergency avoidance steering or upon sudden lane change).

Preferably, parameters indicative of the rolling state of the vehicle include a lateral acceleration.

It is to be noted that the roll-over suppressing control means can decide a start and an end of turning of the vehicle based on the lateral acceleration and the vehicle body speed and can decide a start and an end of steering back turning of the vehicle based on the steering wheel angular velocity and a result of the decision of a start and an end of turning of the vehicle.

With the roll-over suppressing control apparatus for a vehicle, reliable control can be carried out against a moderate change of the rolling state of the vehicle (that is, a change of the rolling state which does not arise from sudden steering as upon continuous turning in the same direction or upon turning on a downhill road).

According to another aspect of the present invention, there is provided a roll-over suppressing control apparatus for a vehicle, comprising a braking mechanism capable of braking left and right wheels of the vehicle separately from each other, a roll parameter value detection sensor for detecting a parameter value corresponding to a rolling state of the vehicle, turning type decision means for deciding a type of turning of the vehicle, and roll-over suppressing control means for controlling the braking mechanism in a predetermined period so that, if the rolling state of the vehicle upon turning of the vehicle becomes greater than a first reference state, then an amount of braking force which depends upon the magnitude of the parameter value detected by the roll parameter value detection sensor and the type of turning of the vehicle decided by the turning type decision means is applied to the turning outer wheel.

With the roll-over suppressing control apparatus for a vehicle, when the rolling state of the vehicle is excessive, an amount of braking force commensurate with the magnitude of the parameter value representative of the rolling state of the vehicle and the type of turning is applied to the turning outer wheel. Consequently, while the traveling performance of the vehicle is assured, roll-over of the vehicle can be suppressed effectively to assure the stability of the vehicle.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 2:
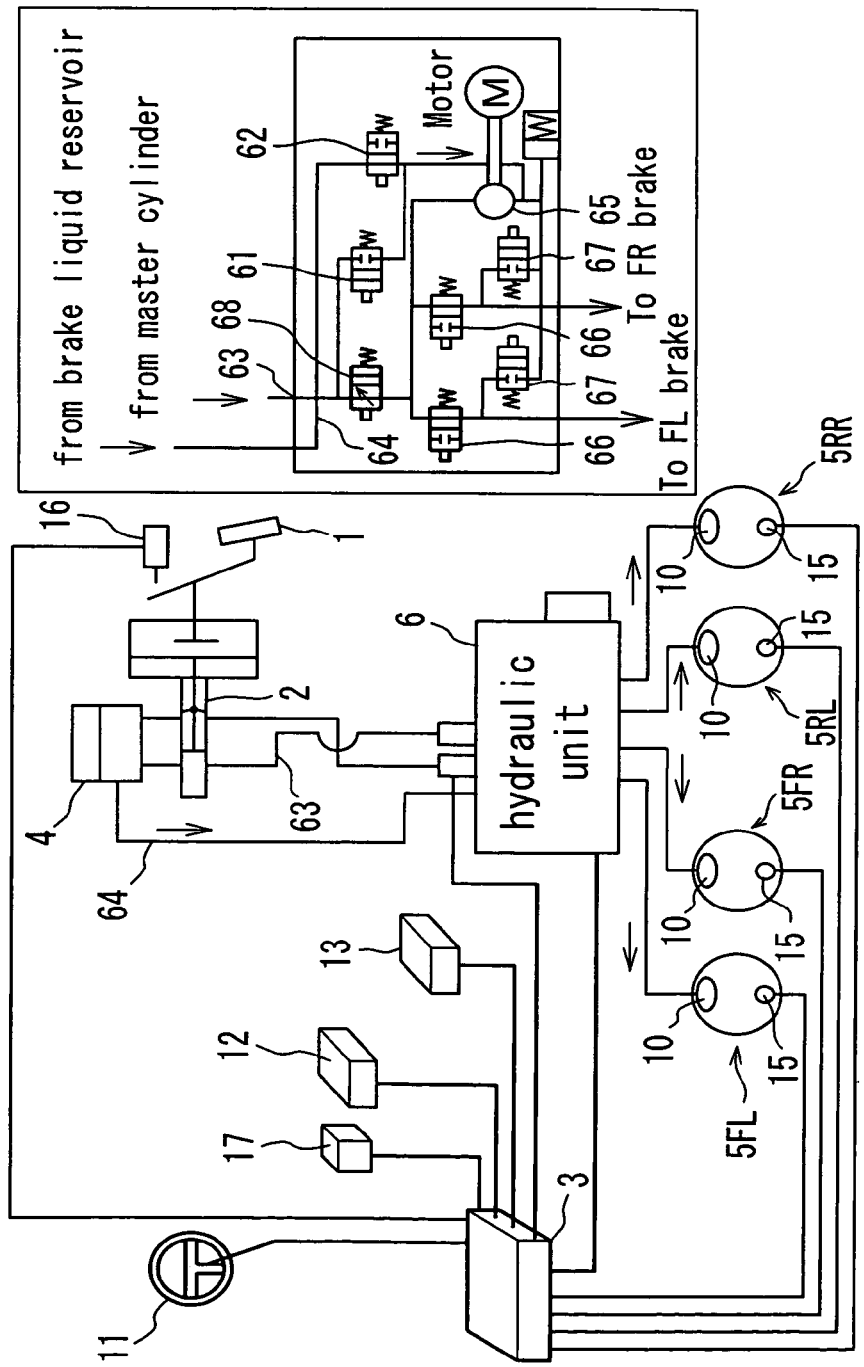
FIG. 2 is a system diagram showing a general configuration of a braking system of a vehicle which includes the roll-over suppressing control apparatus for a vehicle.

Such a braking system for a vehicle as shown in FIG. 2 is utilized in a roll-over suppressing control apparatus according to the present invention. Referring to FIG. 2, the braking system for a vehicle includes a brake pedal 1, a master cylinder 2 which operates in an interlocking relationship with an operation of the brake pedal 1, and a hydraulic unit 6 for controlling the brake fluid pressure to be supplied from the master cylinder 2 or a brake fluid reservoir 4 to wheel cylinders of wheel brakes (hereinafter referred to as brakes) 10 for braking wheels (front left and right wheels and rear left and right wheels) 5FL, 5FR, 5RL, 5RR in response to the state of the master cylinder 2 or an instruction from a braking controller (brake ECU) 3. It is to be noted here that a braking mechanism is formed from a liquid pressure adjusting system including the master cylinder 2, hydraulic unit 6 and so forth and the brakes 10 for the braking wheels and so forth.

As seen in FIG. 2 (in FIG. 2, only the left and right wheel brakes for the front wheels are shown), when the vehicle is in a behavior control mode, a differential pressure regulating valve 68 in the hydraulic unit 6 operates so that a predetermined pressure difference may appear between the upstream and the downstream of the differential pressure regulating valve 68. When the vehicle is in the behavior control mode and the brake pedal 1 is not operated, an in-line intake valve 61 is closed while an out-line intake valve 62 is opened. Consequently, the brake fluid in the brake fluid reservoir 4 is introduced through an out-line 64, the out-line intake valve 62 and a pump 65 and is pressurized by the pump 65, and the pressure of the brake liquid is adjusted by a liquid pressure holding valve 66 and a pressure reducing valve 67 and the brake liquid of the adjusted pressure is supplied to the brakes 10 for the wheels.

When the vehicle is in the behavior control mode and the brake pedal 1 is operated, since the in-line intake valve 61 is opened and the out-line intake valve 62 is closed, the brake fluid in the master cylinder 2 is introduced through an in-line 63, the in-line intake valve 61 and the pump 65 and pressurized by the pump 65. Then, the pressure of the brake fluid is adjusted by the liquid pressure holding valve 66 and the pressure reducing valve 67, and the brake fluid of the adjusted pressure is supplied to the brakes 10 for the wheels. It is to be noted that the in-line 63 and the out-line 64 join together on the downstream of the in-line intake valve 61 and the out-line intake valve 62, and the pump 65 is disposed on the downstream of the joining location. The liquid pressure holding valve 66 and the pressure reducing valve 67 are provided for each of the braking wheels 5FL, 5FR, 5RL, 5RR on the downstream of the pump 65.

Upon normal braking, the in-line intake valve 61 and the out-line intake valve 62 are closed, and the differential pressure regulating valve 68 and the liquid pressure holding valve 66 are opened while the pressure reducing valve 67 is closed. Consequently, a brake fluid pressure corresponding to the pressure (that is, braking operation force) in the master cylinder 2 is supplied to the brake 10 for each of the wheels through the in-line 63, differential pressure regulating valve 68 and liquid pressure holding valve 66. On the other hand, when an ABS (antilock brake system or antiskid brake system) operates, a brake fluid pressure corresponding to the braking operation force is suitably adjusted through the liquid pressure holding valve 66 and the pressure reducing valve 67 so that each wheel may not be locked.

The in-line intake valve 61, out-line intake valve 62, pump 65, liquid pressure holding valves 66, pressure reducing valves 67 and differential pressure regulating valve 68 of the hydraulic unit 6 having such a configuration as described above are controlled by the brake ECU 3.

Various signals are inputted to the brake ECU 3. In particular, a steering wheel angle signal is inputted from a steering wheel angle sensor 11 provided for a steering wheel, and a yaw rate signal of the vehicle body is inputted from a yaw rate sensor 12 provided on the vehicle body. Further, a roll rate signal of the vehicle body is inputted from a roll rate sensor (roll parameter value detection means) 13 provided on the vehicle body, and a brake pedal operation signal is inputted from a brake switch 16. Furthermore, a forward-backward acceleration signal and a lateral acceleration signal are inputted from a forward-backward and lateral acceleration sensor 17 provided on the vehicle body, and vehicle speed (wheel speed) signals are inputted from wheel speed sensors 15.

Figure 1:
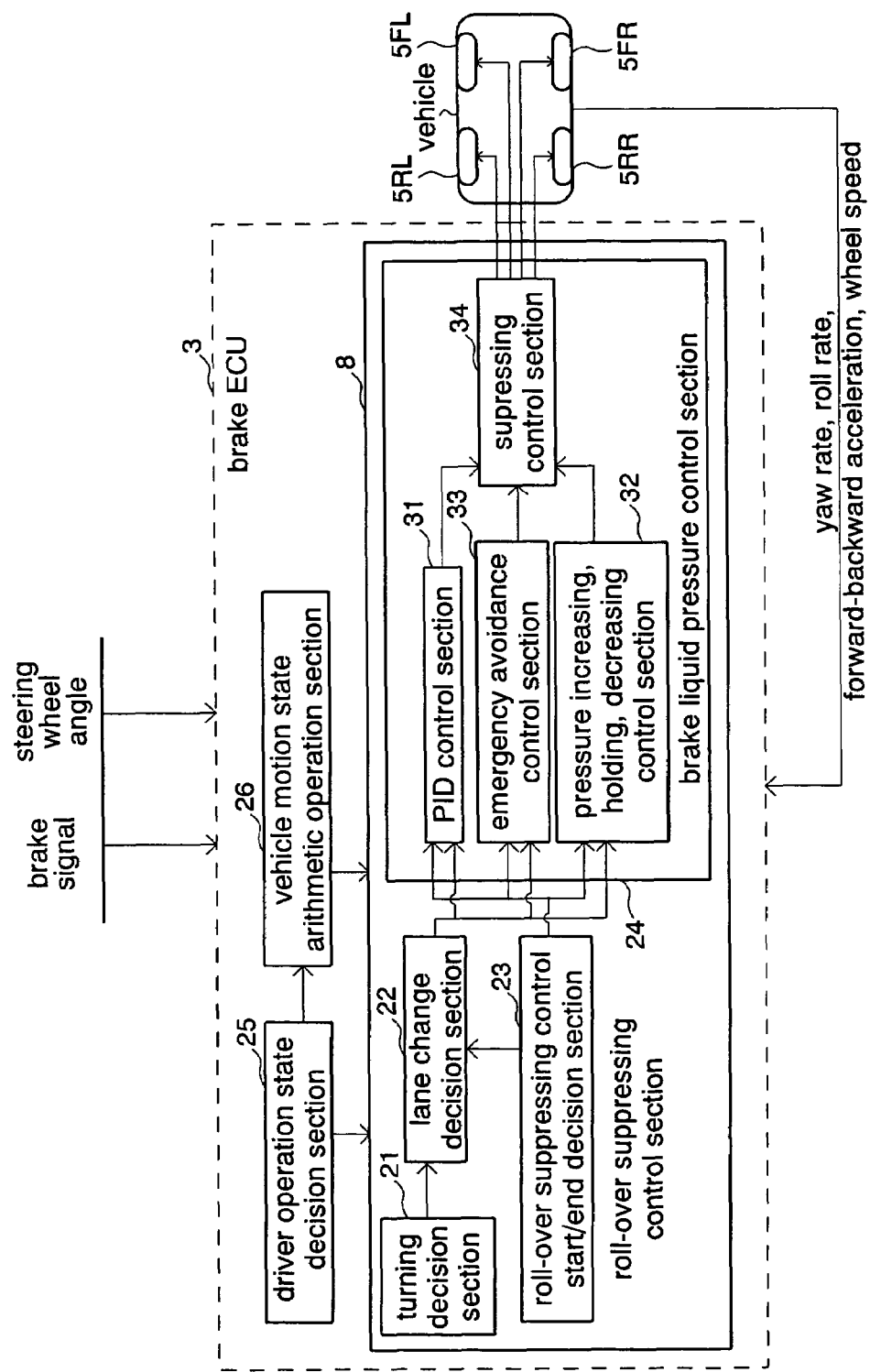
FIG. 1 is a control block diagram of a roll-over suppressing control apparatus for a vehicle according to an embodiment of the present invention.

The brake ECU 3 includes such various functional elements as seen in FIG. 1. Referring to FIG. 1, the brake ECU 3 includes a driver operation state decision section (a driver operation state decision means) 25 for deciding an operation state of the driver, a vehicle motion state arithmetic operation section (a vehicle motion state arithmetic operation means) 26 for calculating a theoretical motion condition of the vehicle, and a roll-over suppressing control section (a roll-over suppressing control means) 8 for performing control for applying braking force for suppressing roll-over of the vehicle to turning outer wheels. It is to be noted that, although the brake ECU 3 additionally includes an automatic slow-down control section, a yaw moment control section (both not shown) and so forth as other control sections, description of such other control sections is omitted herein.

The driver operation state decision section 25 decides whether or not the brake pedal 1 is operated from a brake pedal operation signal from the brake switch 16.

The vehicle motion state arithmetic operation section 26 recognizes a yaw rate $Y_r$ from a yaw rate signal inputted from the yaw rate sensor 12; recognizes a roll rate $R_r$ from a roll rate signal from the roll rate sensor 13; recognizes an actual lateral acceleration $G_y$ from a lateral acceleration signal inputted from the forward-backward and lateral acceleration sensor 17; and recognizes a steering wheel angle $\theta_h$ from steering wheel angle information inputted from the steering wheel angle sensor 11. Further, the vehicle motion state arithmetic operation section 26 calculates a vehicle body speed $V_b$ and a steering wheel angular velocity $\omega_h$. Although the vehicle body speed is normally calculated based on the wheel speed signals from the wheel speed sensors 15, if a slip occurs with a wheel, then the vehicle motion state arithmetic operation section 26 adds a time integrated value of a forward-backward acceleration obtained from the forward-backward and lateral acceleration sensor 17 to the vehicle body speed based on the wheel speed signal till then to calculate the vehicle body speed (in this instance, the calculated vehicle body speed is an estimated vehicle body speed). Further, the steering wheel angular velocity $\omega_h$ is calculated as a rate of change (time differentiated value) of the steering wheel angle $\theta_h$.

The roll-over suppressing control section 8 includes a turning decision section (a turning decision means) 21 for deciding whether or not the vehicle is turning (particularly, a start and an end of turning), a lane change decision section (a lane change decision means) 22 serving as steering back turning decision means for deciding whether or not the vehicle is turning and steering back turning as represented by lane change is proceeding (particularly a start and an end of steering back turning), a roll-over suppressing control start/end decision section (a roll-over suppressing control start/end decision means) 23 for deciding a start and an end of roll-over suppressing control, and a brake liquid pressure control section (a brake liquid pressure control means) 24 for controlling the brake liquid pressure based on a result of the decision by the decision sections. The braking control performed by the roll-over suppressing control section 8 is control of adding braking force to turning outer wheels of the vehicle. The magnitude of the braking force to be applied then is calculated and set based on results of various decisions of functional elements described below.

The turning decision section 21 decides a start and an end of turning of the vehicle based on the lateral acceleration $G_y$, vehicle body speed $V_b$, yaw rate $Y_r$ and steering wheel angle $\theta_h$. Further, the turning decision section 21 sets on/off of a turning flag $F_{senkai}$ indicating that the vehicle is turning based on a result of the decision.

It is to be noted that the term turning signifies a state of the vehicle when the vehicle travels while it is kept steered in one direction, that is, in the leftward direction or the rightward direction. In the present embodiment, the turning start conditions of the vehicle are (1) that the magnitude of the lateral acceleration $G_y$ is equal to or higher than a reference value (fixed value set in advance) $G_{y1}$ and (2) that the vehicle body speed $V_b$ is equal to or higher than a reference value (low speed value set in advance) $V_1$. If all of the conditions are satisfied, then the turning decision section 21 decides that the vehicle has started turning and sets the turning flag $F_{senkai}$ to $F_{senkai}=1$.

Meanwhile, the turning end conditions of the vehicle are, while the turning flag $F_{senkai}$ is in a set state of $F_{senkai}=1$, (1) that the vehicle body speed $V_b$ is lower than a reference value (low speed value determined in advance) $V_2$ (where $V_2<V_1$) and (2) that the magnitude of the lateral acceleration $G_y$ is lower than a reference value (fixed value set in advance) $G_{y2}$ (where $G_{y2}<G_{y1}$). If even one of the two conditions is satisfied, then the turning decision section 21 decides that the vehicle has ended the turning, and sets the turning flag $F_{senkai}$ to $F_{senkai}=0$.

In this manner, the turning flag $F_{senkai}$ is set to $F_{senkai}=1$ while the vehicle is turning but to $F_{senkai}=0$ when the vehicle is not turning.

The lane change decision section 22 decides a start and an end of steering back turning of the vehicle as represented by lane change based on the values of the steering wheel angular velocity $\omega_h$ calculated by the vehicle motion state arithmetic operation section 26 and the turning flag $F_{senkai}$ set by the turning decision section 21. Further, the lane change decision section 22 sets on/off of a lane change decision flag $F_{LC}$ representing that the vehicle is during steering back turning (which may be hereinafter referred to also as lane change) based on a result of the decision.

It is to be noted that the term steering back turning signifies such turning of the vehicle that, while the vehicle is turning, the vehicle is steered in the direction opposite to the turning direction so that it thereafter turns in this opposite direction. Here, since the types of turning are roughly classified into one-directional turning and steering back turning, the lane change decision section 22 as steering back turning decision means functions as turning type decision means for deciding a type of turning. While the steering back turning is often observed upon S-shaped curve traveling, upon lane change and upon emergency avoidance steering of an obstacle, in the present embodiment, comparatively slow steering back turning upon S-shaped curve traveling and so forth and comparatively quick steering back turning upon lane change, emergency avoidance steering and so forth are handled separately from each other.

It is to be noted that the start conditions of lane change are (1) that the vehicle is turning (turning flag $F_{senkai}=1$) and (2) that the steering wheel angular velocity $\omega_h$ is equal to or greater than an angular velocity set in advanced in the opposite direction to the turning direction (first conditions), and if all of the two conditions are satisfied, then the lane change decision section 22 decides that the vehicle has started lane change (start of steering back turning) and sets the lane change decision flag $F_{LC}$ to $F_{LC}=1$.

On the other hand, the end condition of lane change is (1) that the vehicle is not in a turning state (turning flag $F_{senkai}=0$). If this condition is satisfied, then the lane change decision section 22 decides that the lane change has ended (end of steering back turning) and sets the lane change decision flag $F_{LC}$ to $F_{LC}=0$.

The roll-over suppressing control start/end decision section 23 decides based on the vehicle body speed $V_b$, lateral acceleration $G_y$, roll rate $R_r$, yaw rate $Y_r$ and steering wheel angle $\theta_h$ calculated by the vehicle motion state arithmetic operation section 26 whether or not the roll-over suppressing control of the vehicle should be started or ended.

The start conditions of the roll-over suppressing control are (1) that the vehicle body speed $V_b$ is equal to or higher than the reference value (low speed value set in advance) $V_1$, (2) that the magnitude of the lateral acceleration $G_y$ is equal to or higher than the reference value (value set in advance) $G_{y1}$ and (3) that the magnitude of the roll rate $R_r$ is equal to or higher than a reference value (control starting threshold value set in advance) $R_{rS}$. If all of the three conditions are satisfied, then the roll-over suppressing control start/end decision section 23 decides that control for suppressing roll-over is required, and sets the roll-over suppressing control carrying out flag $F_{ropRR}$ to $F_{ropRR}=1$ based on a result of the decision. It is to be noted that the state wherein the three conditions are satisfied is defined as a state wherein the rolling state is excessive with respect to the first reference state.

In the roll-over suppressing control, braking force is applied to turning outer wheels. The magnitude of the braking force applied at this time is set as a value corresponding to the magnitude of the roll rate $R_r$. It is to be noted that, in the present embodiment, the pressure increase/decrease gradient $PR_{RR}$ of the brake liquid pressure controlled by the hydraulic unit 6 is set as a value corresponding to the magnitude of the roll rate $R_r$, and the particular magnitude of the pressure increase/decrease gradient $PR_{RR}$ is set by one of a PID control section (a PID control means) 31, a pressure increasing, holding, decreasing control section (a pressure increasing, holding, decreasing control means) 32 and an emergency avoidance control section (an emergency avoidance control means) 33 which are hereinafter described.

Meanwhile, the end conditions of the roll-over suppressing control are (1) that the vehicle body speed $V_b$ is lower than the reference value (low speed value set in advance) $V_2$ (where $V_2<V_1$), (2) that the turning direction changes over, and (3) that the magnitude of the roll rate $R_r$ is lower than a reference value (control ending threshold value set in advance) $R_{rE}$ (where $R_{rE}<R_{rs}$). If even one of the three conditions is satisfied, then the roll-over suppressing control start/end decision section 23 decides that the control for suppressing roll-over is unnecessary, and sets the roll-over suppressing control flag $F_{ropRR}$ to $F_{ropRR}=0$ based on the decision. It is to be noted that, in the present embodiment, the state wherein any one of the conditions is satisfied is defined as a state wherein the rolling state is suppressed below the second reference state. Further, the changeover of the turning direction described above is decided such that, when the sign of the yaw rate $Y_r$ changes over, it is decided that the turning direction has changed over.

The brake liquid pressure control section 24 includes a PID control section 31, a pressure increasing, holding, decreasing control section 32, an emergency avoidance control section 33 and a suppressing control section (a suppressing control means) 34, and selects the control sections based on decisions of the decision sections described above to control the brake liquid pressure to the braking wheels.

The PID control section 31 is control means which is selected when the lane change decision flag $F_{LC}$ is 0 (off) during roll-over suppressing control. The control of the PID control section 31 is such that the value of the roll rate $R_{rclip}$ upon starting of the roll-over suppressing control is clipped and the difference ($R_r-R_{rclip}$) between the clip value $R_{rclip}$ of the roll rate and the actual roll rate $R_r$ is used as a control amount to calculate the pressure increase/decrease gradient $PR_{RR}$ of the brake liquid pressure through general PID control (this control mode is referred to as PID control mode).

Figure 5:
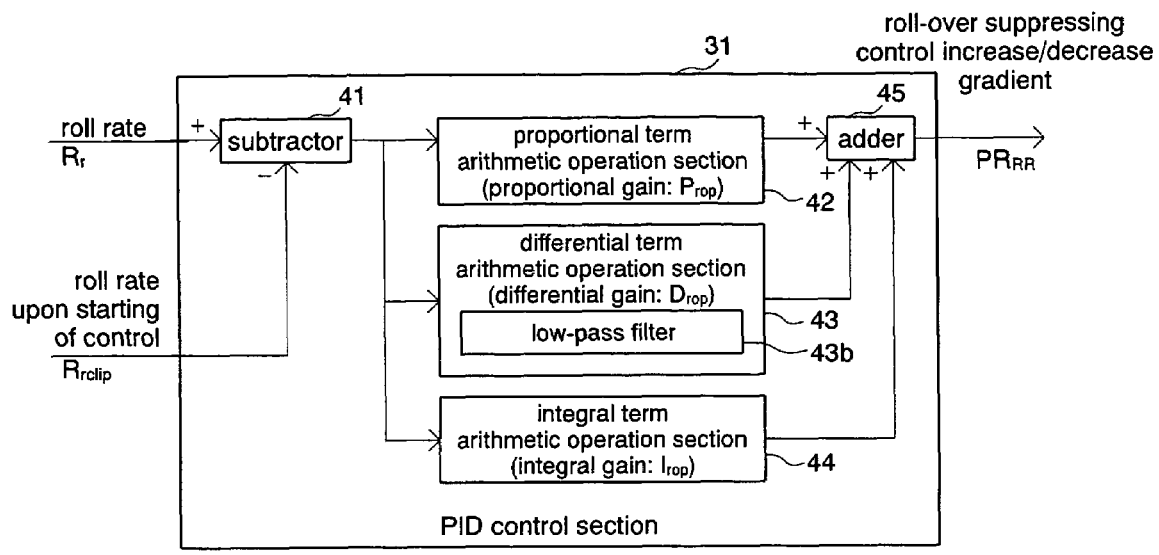
FIG. 5 is a control block diagram of a PID control section of the roll-over suppressing control apparatus for a vehicle.

More particularly, as seen in FIG. 5, the roll rate $R_r$ and the clip value $R_{rclip}$ of the roll rate upon starting of the roll-over suppressing control are inputted to the PID control section 31, and the difference between the clip value of the roll rate and an actual roll rate is calculated by a subtractor 41. Further, a control amount necessary for control is arithmetically operated by each of a proportional term arithmetic operation section 42, a differential term arithmetic operation section 43 and an integral term arithmetic operation section 44.

The proportional term arithmetic operation section 42 multiplies the difference calculated by the subtractor 41 by a roll control proportional gain $P_{rop}$. The differential term arithmetic operation section 43 time differentiates the difference calculated by the subtractor 41, and a resulting value is filtered by a low-pass filter 43b and multiplied by a roll control differential gain Drop. The integral term arithmetic operation section 44 multiplies a cumulative value of the difference calculated by the subtractor 41 by a roll control integral gain $I_{rop}$.

Then, the control amounts calculated by the proportional term arithmetic operation section 42, differential term arithmetic operation section 43 and integral term arithmetic operation section 44 are added by an adder 45 and outputted as a roll-over suppressing control pressure increase/decrease gradient $PR_{RR}$ from the PID control section 31.

When the lane change decision flag $F_{LC}$ is 1 (on) during roll-over suppressing control, the pressure increasing, holding, decreasing control section 32 or the emergency avoidance control section 33 is selected.

Of the control means described, the emergency avoidance control section 33 is control means which is selected when the roll rate $R_r$ is equal to or higher than the first threshold value. This control means determines, when the condition described above is satisfied, that the vehicle is in an emergency avoidance state, and sets the brake liquid pressure for the braking wheels to a maximum value of the braking mechanism, that is, a maximum capacity value of the hydraulic unit 6 (it is to be noted that such a control mode as just described is hereinafter referred to as pressure increase high mode). It is to be noted that, if the pressure increase high mode is selected once, then this mode is maintained while the roll-over suppressing control continues. In particular, if the roll rate $R_r$ becomes equal to or higher than the first threshold value even once while the roll-over suppressing control is proceeding, then the pressure increase high mode wherein the brake liquid pressure for the braking wheels is set to the maximum value is selected until the roll-over suppressing control comes to an end.

Meanwhile, the pressure increasing, holding, decreasing control section 32 is control means selected where the roll rate $R_r$ is lower than the first threshold value, and in the present embodiment, the brake liquid pressure for the braking wheels is controlled in three different control modes in response to the magnitude of the roll rate.

In particular, where the value of the roll rate $R_r$ is lower than the first threshold value but equal to or higher than the second threshold value, the pressure increasing, holding, decreasing control section 32 carries out its control in a pressure increase low mode wherein the rate of increase of the brake liquid pressure for the braking wheels is kept fixed. However, where the value of the roll rate $R_r$ is lower than the second threshold value but equal to or higher than the third threshold value, the pressure increasing, holding, decreasing control section 32 carries out its control in a holding mode wherein the brake liquid pressure for the braking wheels is kept fixed. Further, where the value of the roll rate $R_r$ is lower than the third threshold value, the pressure increasing, holding, decreasing control section 32 carries out its control in a pressure decrease mode wherein the rate of decrease of the brake liquid pressure for the braking wheels is kept fixed.

Figure 3:
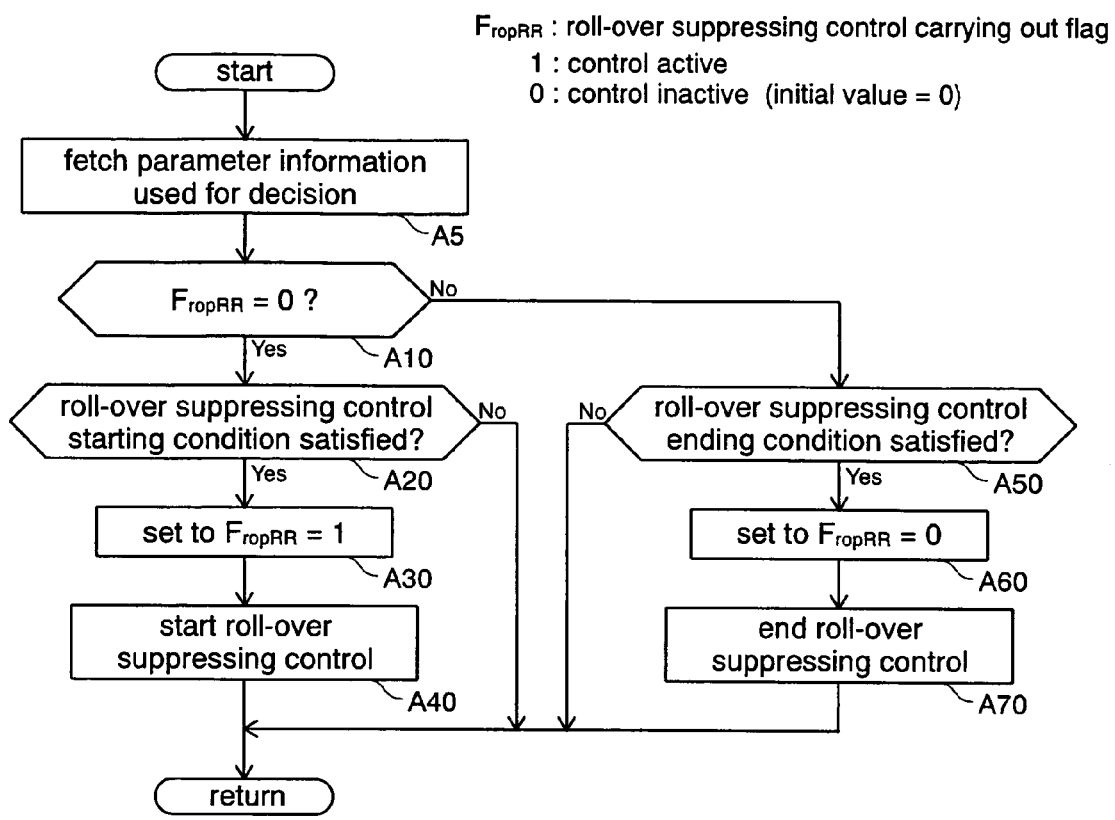
FIG. 3 is a flow chart illustrating a control flow for deciding a start and an end of roll-over suppressing control by the roll-over suppressing control apparatus for a vehicle.

Since the roll-over suppressing control apparatus for a vehicle according to the embodiment of the present invention is configured in such a manner as described above, it carries out its control, for example, in such a manner as illustrated in FIG. 3.

First, in the present roll-over suppressing control apparatus, the roll-over suppressing control section 8 (particularly the roll-over suppressing control start/end decision section 23) decides whether or not braking control should be carried out in accordance with a flow shown in FIG. 3. This flow is for deciding a start condition or an end condition of the roll-over suppressing control to carry out the control.

First at step A5, parameters necessary to decide a start or an end of roll-over suppressing control are inputted. Then at step A10, it is decided whether or not roll-over suppressing control is being performed. The flag $F_{ropRR}$ used for the decision is a flag (roll-over suppressing control carrying out flag) representative of a state in which roll-over suppressing control is being carried out, and the initial value for the flag $F_{ropRR}$ is set to 0. Here, if $F_{ropRR}=0$, then since roll-over suppressing control is not being carried out, the processing advances to step A20, at which the start condition of roll-over suppressing control is decided. On the other hand, where $F_{ropRR}=1$, since roll-over suppressing control has been started, the processing advance to step A50, at which the end condition of roll-over suppressing control is decided.

At step A20, it is decided based on the parameters inputted at step A5 whether or not the start conditions of roll-over suppressing control are satisfied. If the conditions are satisfied, then the processing advances to step A30, at which the flag $F_{ropRR}$ is set to 1 (on). Then at step A40, roll-over suppressing control is started, and then the flow is ended. On the other hand, if the conditions are not satisfied, then the flow is ended without changing the flag and the control.

On the other hand, if the decision at step A10 is $F_{ropRR}=1$, then it is decided based on the parameters inputted at step A5 whether or not the end conditions of roll-over suppressing control are satisfied at step A50. If this conditions are satisfied, then the processing advances to step A60, at which the flag $F_{ropRR}$ is set to 0. Then at A70, the roll-over suppressing control is ended, and then this flow is ended. On the other hand, if the conditions are not satisfied, then this flow is ended without changing the flag and the control.

Figure 4:
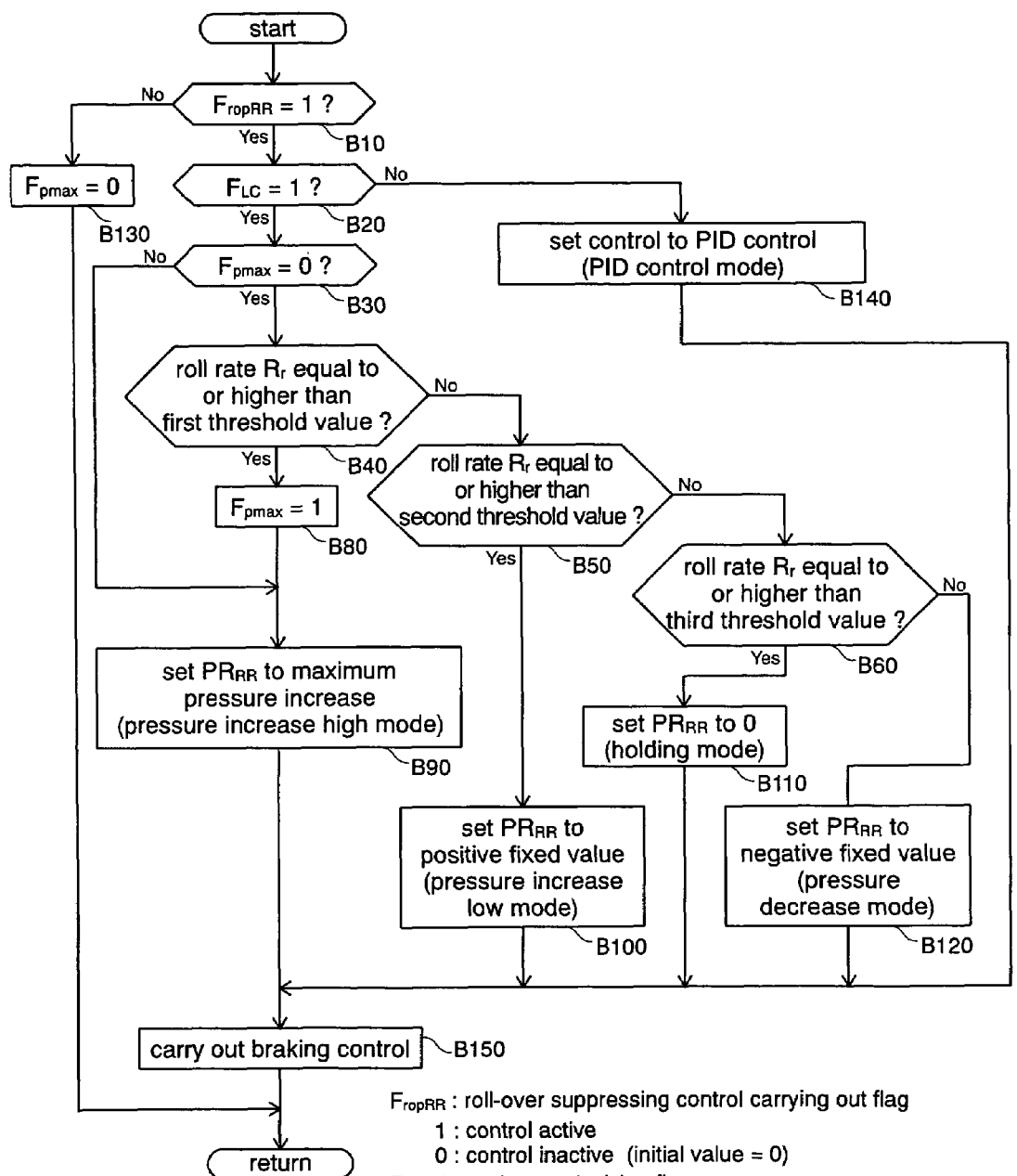
FIG. 4 is a flow chart illustrating a control flow for setting a control amount of the roll-over suppressing control by the roll-over suppressing control apparatus for a vehicle.

Meanwhile, the control amount of the roll-over suppressing control is determined in accordance with a flow illustrated in FIG. 4. It is to be noted here that, as the control amount of the roll-over suppressing control, principally the magnitude $PR_{RR}$ of the rate of change of the brake liquid pressure is controlled.

First at step B10, it is decided based on the value of the flag $F_{ropRR}$ set in the flow illustrated in FIG. 3 whether or not the roll-over suppressing control is active. More particularly, it is decided whether or not the roll-over suppressing control flag $F_{ropRR}$ is 1 (on). If it is decided that the roll-over suppressing control flag $F_{ropRR}$ is $F_{ropRR}=1$ (roll-over suppressing control is being carried out), then the processing advances to step B20. On the other hand, if $F_{ropRR}=0$ (roll-over suppressing control is not being carried) is decided, then the processing advances to step B130, at which a maximum pressure increase flag $F_{pmax}$ is set to $F_{pmax}=0$, and then the flow is ended. It is to be noted that the maximum pressure increase flag $F_{pmax}$ is hereinafter described.

Then at step B20, it is decided whether or not the vehicle is during lane change. More particularly, the lane change decision flag $F_{LC}$ set by the lane change decision section 22 is decided. Here, if the lane change decision flag $F_{LC}$ is 1 (on), then the processing advances to step B30, but if the lane change decision flag $F_{LC}$ is 0 (off), then the processing advances to step B140.

At step B30, it is decided whether or not the maximum pressure increase flag $F_{pmax}$ is $F_{pmax}=0$. The maximum pressure increase flag $F_{pmax}$ is initially set to $F_{pmax}=0$ and represents whether or not the vehicle is in a state wherein emergency avoidance steering is proceeding during lane change turning. Here, if $F_{pmax}=0$, then the processing advances to a flow for decision of the magnitude of the roll rate beginning with step B40, but if $F_{pmax}=1$ (emergency avoidance state), then the processing advances to step B90.

At step B40, it is decided whether or not the magnitude of the roll rate $R_r$ is equal to or higher than the first threshold value. This first threshold value is set in advance as a threshold value for deciding whether or not the vehicle is in the emergency avoidance state described hereinabove. If it is decided that the magnitude of the roll rate $R_r$ is equal to or higher than the first threshold value, then the processing advances to step B80, at which the maximum pressure increase flag $F_{pmax}$ is set to $F_{pmax}=1$. Then, the processing advances to step B90, at which the brake liquid pressure for the braking wheels is set to the pressure increase high mode wherein it is set to the maximum value of the braking mechanism, that is, to the maximum capacity value of the hydraulic unit 6. Then at step B150, brake control is carried out, and then the flow is ended. On the other hand, where the magnitude of the roll rate is lower than the first threshold value, the processing advances to step B50.

It is to be noted that, when $F_{pmax}=1$ at step B30, the processing skips the steps B40 to B80 and advances directly to step B90, at which the brake liquid pressure for the braking wheels is set to the maximum value of the braking mechanism. If it is decided once that the vehicle is in an emergency avoidance state, then unless the roll-over suppressing control decision changes (that is, unless the series of steps of the roll-over suppressing control comes to an end once), the braking control with the maximum value set at step B90 continues.

At step B50, it is decided whether or not the magnitude of the roll rate $R_r$ is equal to or higher than the second threshold value but lower than the first threshold value. This second threshold value is set in advance as a threshold value for deciding whether or not increase of the brake liquid pressure for the braking wheels for suppressing roll-over of the vehicle is required. Here, if it is determined that the magnitude of the roll rate $R_r$ is equal to or higher than the second threshold value but lower than the first threshold value, then the processing advances to step B100, at which the pressure increasing low mode wherein the increase rate $PR_{RR}$ of the brake liquid pressure for the braking wheels is kept fixed to a positive value is set. Then at step B150, brake control is carried out, and then the flow is ended. On the other hand, if the magnitude of the roll rate $R_r$ is lower than the second threshold value, then the processing advances to step B60.

At step B60, it is decided whether or not the magnitude of the roll rate $R_r$ is equal to or higher than the third threshold value but lower than the second threshold value. This third threshold value is set in advance as a threshold value for deciding whether or not it is necessary to keep the brake liquid pressure for the braking wheels for suppressing roll-over of the vehicle. Here, if it is decided that the magnitude of the roll rate $R_r$ is equal to or higher than the third threshold value but lower than the second threshold value, the processing advances to step B110, then the control mode is set to the holding mode. Then at step B150, brake control is carried out, and then the flow is ended (that is, the rate of increase of the brake liquid pressure for the braking wheels here is set to $PR_{RR}=0$).

Where the magnitude of the roll rate $R_r$ is lower than the third threshold value, it is decided that it is not necessary to increase or keep the brake liquid pressure for the braking wheels for suppressing roll-over of the vehicle. Thus, the processing advances to step B120, at which the control mode is set to the pressure decrease mode wherein the decrease rate $PR_{RR}$ of the brake liquid pressure for the braking wheels is kept fixed to a negative value. Then at step B150, brake control is carried out, and then this flow is ended.

On the other hand, if the lane change decision flag $F_{LC}$ is $F_{LC}=0$ (off) at step B20, then the processing advances to step B140, at which the PID control mode is set by the PID control section 31. Then at step B150, brake control is carried out, and then this flow is ended.

In this manner, in the present apparatus, since a control mode is selected in response to a result of the lane change decision while the roll-over suppressing control is active, the braking control amount for suppressing roll-over of the vehicle can be adjusted to a value suitable for the roll rate $R_r$ and a traveling situation of the vehicle such as sudden lane change or S-shaped curve running. Consequently, a suitable braking effect conforming to the traveling state of the vehicle can be obtained.

Figure 6:
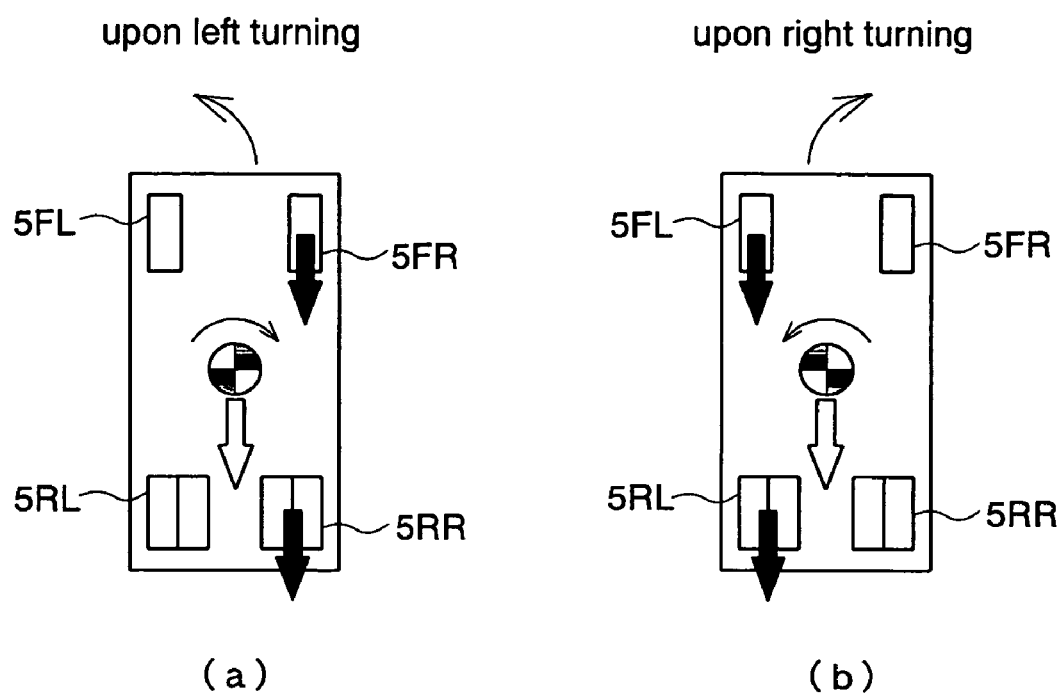
FIG. 6(a) is a schematic view schematically illustrating force applied to the vehicle which includes the roll-over suppressing control apparatus for a vehicle of FIG. 1 when the vehicle turns in a leftward direction.
FIG. 6(b) is a schematic view schematically illustrating force applied to the vehicle which includes the roll-over suppressing control apparatus for a vehicle of FIG. 1 when the vehicle turns in a rightward direction.

Further, in the present embodiment, upon brake control in the roll-over suppressing control, the braking control amount set in such a manner as described above is applied as braking force to turning outer wheels. For example, during turning of the vehicle in a leftward direction as seen in FIG. 6(*a*), braking force is applied to the right front wheel 5FR and the right rear wheel 5RR which are turning outer wheels. On the other hand, during turning of the vehicle in a rightward direction as seen in FIG. 6(*b*), braking force is applied to the left front wheel 5FL and the left rear wheel 5RL.

In particular, upon turning of the vehicle in the leftward direction, braking force applied to the right front wheel 5FR and the right rear wheel 5RR causes the vehicle to generate a yaw moment in the clockwise direction as seen in FIG. 6(*a*). This yaw moment in the clockwise direction acts to increase the turning radius of the vehicle in the leftward direction (that is, the yaw moment provides an under steer tendency to the steering characteristic of the vehicle so that the traveling route may be swollen to the turning outer side) thereby to suppress the rolling angle in the rightward roll-over direction generated on the vehicle. Further, upon turning of the vehicle in the leftward direction, the pressure of ground contact of the left front wheel 5FL and the left rear wheel 5RL which are turning inner wheels decreases, and particularly in a situation wherein roll-over suppressing control is required, the tyres do not sometimes contact with the ground. Meanwhile, since the pressure of ground contact of the right front wheel 5FR and the right rear wheel 5RR which are turning outer wheels has an increasing tendency, by applying braking force to the right front wheel 5FR and the right rear wheel 5RR, the vehicle body speed $V_b$ can be slowed down effectively, and rolling of the vehicle in the rightward roll-over direction can be suppressed effectively.

Similarly, upon turning of the vehicle in the rightward direction, braking force applied to the left front wheel 5FL and the left rear wheel 5RL causes the vehicle to generate a yaw moment in the counterclockwise direction as seen in FIG. 6(*b*). This yaw moment in the counterclockwise direction acts to increase the turning radius of the vehicle in the rightward direction (that is, the yaw moment provides an under steer tendency to the steering characteristic of the vehicle so that the traveling route may be swollen to the turning outer side) thereby to suppress the rolling angle in the leftward roll-over direction generated on the vehicle. Thus, by applying braking force to the left front wheel 5FL and the left rear wheel 5RL which are turning outer wheels, the vehicle body speed V*b* can be slowed down effectively, and rolling of the vehicle in the leftward roll-over direction can be suppressed effectively.

In this manner, according to the present roll-over suppressing control apparatus, if it is decided by the lane change decision section 22 that the rolling state of the vehicle is excessive upon sudden lane change or the like and thereupon the roll rate $R_r$ of a magnitude equal to or higher than the first threshold value is detected, then braking control is carried out with the brake liquid pressure for the braking wheels set to the maximum value of the braking mechanism. Consequently, the rolling of the vehicle can be suppressed efficiently and the roll-over preventing effect of the vehicle can be raised.

Further, if it is decided once that the vehicle is in an emergency avoidance state, then since the braking control with the maximum value of the braking mechanism is continued until the roll-over suppressing control comes to an end, roll-over can be suppressed with certainty thereby to assure the stability of the vehicle. In particular, in such an instance as just described, it is considered that the possibility that the roll rate $R_r$ may be suppressed as the control amount (brake liquid pressure) is raised is high, and if the control amount (brake liquid pressure) is lowered because the roll rate $R_r$ has become low, then the roll rate $R_r$ becomes high again, which increases the possibility of roll-over. Therefore, it is considered that, in order to suppress such roll-over with certainty, it is effective to hold the control amount (brake liquid pressure) till the point of time of the end of the roll-over suppressing control.

Further, since the braking control amount corresponding to the magnitude of the roll rate $R_r$ continues to be applied to turning outer wheels unless the roll rate $R_r$ becomes excessive, braking force is prevented from being applied excessively and roll-over of the vehicle can be suppressed efficiently. Further, according to the present apparatus, since the increase rate $PR_{RR}$ of the brake liquid pressure is changed to decrease the braking force in response to decrease of the roll rate $R_r$ detected, roll-over of the vehicle can be suppressed effectively without making the behavior of the vehicle unstable.

Further, since the roll rate $R_r$ is used as a parameter corresponding to the rolling state of the vehicle, where a sudden change of the behavior of the vehicle is involved such as upon lane change or emergency avoidance steering, the roll-over of the vehicle can be suppressed effectively.

While a predetermined embodiment of the present invention is described above, the present invention is not limited to the embodiment specifically described above, and variations and modifications can be made without departing from the scope of the present invention.

For example, while, in the embodiment described above, the roll rate $R_r$ is used as a parameter representative of the rolling state of the vehicle, the lateral acceleration $G_y$ of the vehicle may be used in place of the roll rate $R_r$. Or, both of the roll rate $R_r$ and the lateral acceleration $G_y$ may be used. It is to be noted that, where the lateral acceleration $G_y$ of the vehicle is used in place of the roll rate $R_r$ as a parameter representative of the rolling state of the vehicle in the embodiment described above, from a characteristic which the parameter of the lateral acceleration $G_y$ has, roll-over of the vehicle where a sudden change of the behavior of the vehicle is not involved such as upon traveling along a loop bridge, upon continuous one-directional turning or upon turning on a downward slope can be suppressed effectively.

On the other hand, where both of the roll rate $R_r$ and the lateral acceleration $G_y$ are used, roll-over of the vehicle can be suppressed effectively in both of a case wherein a sudden change in behavior is involved and another case whereon a sudden change in behavior is not involved.

Further, while, in the embodiment described above, the braking force of the roll-over suppressing control is applied as it is to turning outer wheels of the vehicle, some other vehicle behavior control such as yaw moment control or automatic slowdown control may possibly be executed simultaneously. In this instance, independent arithmetic operation may be performed in the calculation process of each control amount and the control amounts may be added at a point of time when braking control is performed to carry out control, or alternatively, upon calculation of the sum of the control amounts, weighted addition (arithmetic operation that the control amounts are multiplied individually by predetermined coefficients and then added) may be used.

Further, while, in the embodiment described above, when the vehicle is in the behavior control mode, braking control which does not rely upon the operation mount of the brake pedal is carried out, a braking control amount in the behavior control mode and a braking control amount corresponding to the operation amount of the brake pedal may be added to carry out control or else may be weighted added to carry out control.

Further, while, in the embodiment described above, when it is decided upon setting of a control amount of roll-over suppressing control that the magnitude of the roll rate $R_r$ is equal to or higher than the first threshold value, the brake liquid pressure for the braking wheels is set to the maximum value of the braking mechanism, alternatively the increase rate $PR_{RR}$ of the brake liquid pressure for the braking wheels maybe set as a predetermined value higher than the increase rate $PR_{RR}$ set in the pressure increase low mode.

The invention claimed is:

1. A roll-over suppressing control apparatus for a vehicle, comprising:
    a braking mechanism that brakes left and right wheels of said vehicle separately from each other;
    roll parameter value detection means for detecting a parameter value corresponding to a rolling state of said vehicle;
    turning type decision means for determining whether a turning mode of said vehicle is in a one-directional turning mode where said vehicle turns only in one direction or a steering back turning mode where a steering wheel of said vehicle is rotated in multiple directions to change the direction of turning of the vehicle; and
    roll-over suppressing control means for controlling said braking mechanism to apply braking force only to left or right turning outer wheels, which are the wheels positioned on the outer radius of the vehicle making a turn, when the rolling state of the vehicle upon turning of the vehicle becomes greater than a first reference state,
    wherein an amount of braking force applied to only the left or right turning outer wheels depends upon a magnitude of the parameter value detected by said roll parameter value detection means and the turning mode of said vehicle determined by said turning type decision means,
    wherein said turning type decision means decides that the vehicle is in the steering back turning mode if a steering wheel angular velocity is equal to or greater than an angular velocity set in advance in the opposite direction to the turning direction, and
    wherein said turning type decision means decides that the vehicle is in the one-directional turning mode if the steering wheel angular velocity is lesser than the angular velocity set in advance.

2. The roll-over suppressing control apparatus for a vehicle as claimed in claim 1, wherein said roll-over suppressing control means ends an application of braking force only to the turning outer wheels when the rolling state of said vehicle upon turning of said vehicle becomes smaller than a second reference state.

3. The roll-over suppressing control apparatus for a vehicle as claimed in claim 1, wherein parameters indicative of the rolling state of said vehicle include a roll rate of said vehicle.

4. The roll-over suppressing control apparatus for a vehicle as claimed in claim 1, wherein parameters indicative of the rolling state of said vehicle include a lateral acceleration.

5. A roll-over suppressing control apparatus for a vehicle, comprising:
    a braking mechanism that brakes left and right wheels of said vehicle separately from each other;
    roll parameter value detection means for detecting a parameter value corresponding to a rolling state of said vehicle;
    turning type decision means for determining whether a turning mode of said vehicle is in a one-directional turning mode where said vehicle turns only in one direction or a steering back turning mode where a steering wheel of said vehicle is rotated in multiple directions to change the direction of turning of the vehicle; and
    roll-over suppressing control means for controlling said braking mechanism so that, if the rolling state of said vehicle upon turning of said vehicle becomes greater than a first reference state, then an amount of braking force, which depends upon a magnitude of the parameter value detected by said roll parameter value detection means and the turning mode of said vehicle determined by said turning type decision means, is applied only to left or right turning outer wheels, which are the wheels positioned on the outer radius of the vehicle making a turn,
    wherein said roll-over suppressing control means sets the amount of braking force to be applied only to the turning outer wheels to a maximum value to control said braking mechanism when the magnitude of the parameter value detected by said roll parameter value detection means, upon the turning type decision means determining that vehicle is in the steering back turning mode, is equal to or greater than a first threshold value,
    wherein said turning type decision means decides that the vehicle is in the steering back turning mode if a steering wheel angular velocity is equal to or greater than an angular velocity set in advance in the opposite direction to the turning direction, and
    wherein said turning type decision means decides that the vehicle is in the one-directional turning mode if the steering wheel angular velocity is lesser than the angular velocity set in advance.

6. The roll-over suppressing control apparatus for a vehicle as claimed in claim 5, wherein said roll-over suppressing control means performs proportional-integral-differential (PID) control based on the parameter value detected by said roll parameter value detection means upon the turning type decision means determining that vehicle is in the one-directional turning mode to control the amount of braking force to be applied only to the turning outer wheels.

7. The roll-over suppressing control apparatus for a vehicle as claimed in claim 5, wherein said roll-over suppressing control means ends an application of breaking force only to the turning outer wheels when the rolling state of said vehicle upon turning of said vehicle becomes smaller than a second reference state.

8. The roll-over suppressing control apparatus for a vehicle as claimed in claim 5, wherein, when the magnitude of the parameter value detected by said roll parameter value detection means, upon the turning type decision means determining that vehicle is in the steering back turning mode, is lower than the first threshold value but equal to or higher than a second threshold value, which is set in advance as a value lower than the first threshold value, said roll-over suppressing control means sets the amount of braking force to be applied only to the turning outer wheels to a positive fixed value set in advance to control said braking mechanism.

9. The roll-over suppressing control apparatus for a vehicle as claimed in claim 8, wherein, when the magnitude of the parameter value detected by said roll parameter value detection means, upon the turning type decision means determining that vehicle is in the steering back turning mode, is lower than the second threshold value but equal to or higher than a third threshold value, which is set in advance as a value lower than the second threshold value, said roll-over suppressing control means controls said braking mechanism to maintain the braking force only to the turning outer wheels.

10. The roll-over suppressing control apparatus for a vehicle as claimed in claim 9, wherein, when the magnitude of the parameter value detected by said roll parameter value detection means, upon the turning type decision means determining that vehicle is in the steering back turning mode, is lower than the third threshold value, said roll-over suppressing control means sets the amount of braking force to be applied only to the turning outer wheels to a negative fixed value set in advance to control said braking mechanism.

11. A roll-over suppressing control apparatus for a vehicle, comprising:

a braking mechanism that brakes left and right wheels of said vehicle separately from each other;

a roll parameter value detection sensor for detecting a parameter value corresponding to a rolling state of said vehicle;

turning type decision means for determining whether a turning mode of said vehicle is in a one-directional turning mode where said vehicle turns only in one direction or a steering back turning mode where a steering wheel of said vehicle is rotated in multiple directions to change the direction of turning of the vehicle; and roll-over suppressing control means for controlling said braking mechanism to apply a braking force only to left or right turning outer wheels, which are the wheels positioned on the outer radius of the vehicle making a turn, when the rolling state of the vehicle upon turning of the vehicle becomes greater than a first reference state, wherein an amount of braking force applied only to the left or right turning outer wheels depends upon a magnitude of the parameter value detected by said roll parameter value detection sensor and the turning mode of said vehicle determined by said turning type decision means, wherein said turning type decision means decides that the vehicle is in the steering back turning mode if a steering wheel angular velocity is equal to or greater than an angular velocity set in advance in the opposite direction to the turning direction, and wherein said turning type decision means decides that the vehicle is in the one-directional turning mode if the steering wheel angular velocity is lesser than the angular velocity set in advance.

* * * * *